US010197102B2

(12) United States Patent
Ghosh et al.

(10) Patent No.: US 10,197,102 B2
(45) Date of Patent: Feb. 5, 2019

(54) LOAD REDUCTION ASSEMBLIES FOR A GAS TURBINE ENGINE

(71) Applicant: GENERAL ELECTRIC COMPANY, Schenectady, NY (US)

(72) Inventors: Shuvajyoti Ghosh, Karnataka (IN); Akash Joshi, Karnataka (IN); Shivaram Ac, Karnataka (IN); Ravindra Shankar Ganiger, Karnataka (IN); Praveen Sharma, Karnataka (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/331,158

(22) Filed: Oct. 21, 2016

(65) Prior Publication Data

US 2018/0112554 A1    Apr. 26, 2018

(51) Int. Cl.
*F16C 35/077* (2006.01)
*F16C 39/02* (2006.01)
*F01D 25/16* (2006.01)
*F01D 5/02* (2006.01)
(Continued)

(52) U.S. Cl.
CPC ............. *F16C 39/02* (2013.01); *F01D 21/08* (2013.01); *F01D 25/164* (2013.01); *F16C 29/123* (2013.01); *F16C 35/077* (2013.01); *F05D 2260/15* (2013.01); *F05D 2300/505* (2013.01); *F16C 2202/06* (2013.01); *F16C 2360/23* (2013.01)

(58) Field of Classification Search
CPC .... F16C 35/073; F16C 39/02; F16C 2202/06; F16C 2360/23; F16C 29/325; F16C 29/123; F02K 3/06; F04D 29/056; F04D 29/053; F05D 2220/36; F05D 2300/505; F05D 2250/70; F05D 2260/15; F01D 21/045; F01D 25/164
USPC ...... 384/495, 535, 581–586, 627; 415/9, 12, 415/142, 174.2, 231; 60/223
See application file for complete search history.

(56) References Cited

U.S. PATENT DOCUMENTS 4,451,110 A * 5/1984 Forestier ............... F01D 25/164
                                                    384/582
4,496,252 A * 1/1985 Horler ............... C23C 16/45504
                                                    384/215
(Continued)

FOREIGN PATENT DOCUMENTS

CA        2841592 A1 * 10/2014   ............. F01D 25/24
EP        1130243 A2 *  9/2001   ........... F02K 1/1207
(Continued)

*Primary Examiner* — Marcus Charles
(74) *Attorney, Agent, or Firm* — General Electric Company; Pamela Kachur

(57) ABSTRACT

A load reduction assembly includes an annular bearing cone configured to extend between a bearing assembly and a frame assembly and form a first load path therebetween. The load reduction assembly further includes an annular recoupler member configured to extend between the bearing assembly and the frame assembly and form a second load path therebetween. The second load path is parallel to the first load path. The recoupler member includes a shape memory alloy configured to change stiffness in response to a change in a stress condition, thereby regulating an imbalance condition of a rotor shaft coupled to the bearing assembly.

11 Claims, 8 Drawing Sheets

(51) Int. Cl.
*F16C 29/12* (2006.01)
*F01D 21/08* (2006.01)

(56) References Cited

U.S. PATENT DOCUMENTS

| | | | |
|---|---|---|---|
| 6,240,719 B1 * | 6/2001 | Vondrell | F01D 21/04 60/223 |
| 6,491,497 B1 | 12/2002 | Allmon et al. | |
| 6,494,032 B2 * | 12/2002 | Udall | F01D 21/045 415/9 |
| 6,796,408 B2 | 9/2004 | Sherwin et al. | |
| 6,799,416 B2 * | 10/2004 | Plona | F01D 21/045 415/9 |
| 7,097,413 B2 * | 8/2006 | VanDuyn | F01D 21/08 415/142 |
| 7,195,444 B2 * | 3/2007 | Brault | F01D 21/045 415/9 |
| 7,404,678 B2 * | 7/2008 | Plona | F01D 21/045 384/495 |
| 8,136,999 B2 * | 3/2012 | Mons | F01D 21/045 384/581 |
| 8,167,531 B2 | 5/2012 | Mollmann et al. | |
| 8,403,634 B2 | 3/2013 | Arness et al. | |
| 8,430,622 B2 * | 4/2013 | Webster | F01D 21/045 415/142 |
| 8,662,756 B2 | 3/2014 | Care et al. | |
| 8,986,146 B2 | 3/2015 | Gallet | |
| 9,140,137 B2 | 9/2015 | Mayer et al. | |
| 2006/0269357 A1 | 11/2006 | Webb | |
| 2011/0150378 A1 | 6/2011 | Care et al. | |
| 2013/0324343 A1 | 12/2013 | Gallet | |

FOREIGN PATENT DOCUMENTS

| | | | | |
|---|---|---|---|---|
| EP | 1344896 A1 * | 9/2003 | ............ | F01D 21/045 |
| FR | 2888621 A1 * | 1/2007 | ............ | F01D 21/045 |
| GB | 2444935 A * | 6/2008 | ............ | F01D 21/045 |

* cited by examiner

LOAD REDUCTION ASSEMBLIES FOR A GAS TURBINE ENGINE

BACKGROUND

The field of the disclosure relates generally to gas turbine engines and, more particularly, to load reduction assemblies for use in gas turbine engines.

Gas turbine engines typically include a rotor assembly, a compressor, and a turbine. The rotor assembly includes a fan that includes an array of fan blades extending radially outward from a fan hub coupled to a rotor shaft. The rotor shaft transfers power and rotary motion from the turbine to the compressor and the fan and is supported axially with a plurality of bearing assemblies spaced axially along the rotor shaft. Additionally, the rotor assembly has an axis of rotation that passes through a rotor assembly center of gravity. Known bearing assemblies include rolling elements and a paired race, wherein the rolling elements are supported within the paired race. The rotor assembly is typically supported on three bearing assemblies, one of which is a thrust bearing assembly and two of which are roller bearing assemblies. The thrust bearing assembly supports the rotor shaft and supports axial and radial movement of the rotor shaft assembly. The remaining roller bearing assemblies support radial movement of the rotor shaft.

During operation of the engine, a fragment of a fan blade may become separated from the remainder of the blades and the rotor assembly. This is typically known as a fan blade out or a blade-off (FBO) event. Accordingly, a substantial rotary unbalanced load may be induced within the rotor assembly that is carried substantially by the fan shaft bearings, the fan bearing supports, and the fan support frames.

To reduce the effects of imbalanced loads, at least some known engines include support components for the fan rotor support system that are sized to provide additional strength for the fan support system. However, increasing the strength of the support components also increases an overall weight of the engine and decreases an overall efficiency of the engine when the engine is operated without substantial rotor imbalances.

Other known engines include a bearing support that includes a mechanically weakened section, or primary fuse, that decouples the fan rotor from the fan support system. During such events, the fan shaft seeks a new center of rotation that approximates that of its unbalanced center of gravity. This fuse section, in combination with a rotor clearance allowance, is referred to as a load reduction device (LRD). The LRD reduces the rotating dynamic loads to the fan support system. After the primary fuse fails, the pitching fan rotor often induces a large moment to a next closest bearing. The next closest bearing is known as the number two bearing position. The moment induced to the number two bearing induces high bending and stress loads to the fan rotor locally. To relieve the high bending stresses, the radial and pitching rotation stiffness of the number two bearing position are often softened or released during the FBO.

After FBO, the fan is typically allowed to rotate, in a process called windmilling, such that drag induced by the engine is reduced. However, during windmilling the loads induced by the rotor assembly and carried by the fan bearings are lower than during the FBO. As such, the LRD designed for FBO increases vibration within the engine during windmilling because stiffness of the number two bearing position is released.

BRIEF DESCRIPTION

In one embodiment, a load reduction assembly is provided. The load reduction assembly includes an annular bearing cone configured to extend between a bearing assembly and a frame assembly and form a first load path therebetween. The load reduction assembly further includes an annular recoupler member configured to extend between the bearing assembly and the frame assembly and form a second load path therebetween. The second load path is parallel to the first load path. The recoupler member includes a shape memory alloy configured to change stiffness in response to a change in a stress condition, thereby regulating an imbalance condition of a rotor shaft coupled to the bearing assembly.

In another embodiment, a load reduction assembly is provided. The load reduction assembly including an annular cage configured to extend between a bearing assembly and a frame assembly and form a load path therebetween, wherein the annular cage includes a plurality of circumferentially spaced openings defined therein. The annular cage comprises a shape memory alloy configured to change stiffness in response to a change in a stress condition, thereby regulating an imbalance condition of a rotor shaft coupled to the bearing assembly. The load reduction assembly also includes a plurality of struts circumferentially spaced around said cage and within said annular cage openings. The plurality of struts configured to form a parallel load path with said cage of said recoupler member.

In a further embodiment, a load reduction assembly is provided. The load reduction assembly includes an annular bearing support configured to extend between a bearing assembly and a frame assembly and form a load path therebetween. The annular bearing support includes at least one first member formed from a first alloy, and a second member coupled to the at least one first member. The second member is formed from a second alloy. The second alloy includes a shape memory alloy configured to change stiffness in response to a change in a stress condition, thereby regulating an imbalance condition of a rotor shaft coupled to the bearing assembly.

DRAWINGS

These and other features, aspects, and advantages of the present disclosure will become better understood when the following detailed description is read with reference to the accompanying drawings in which like characters represent like parts throughout the drawings, wherein.

Figure 1:
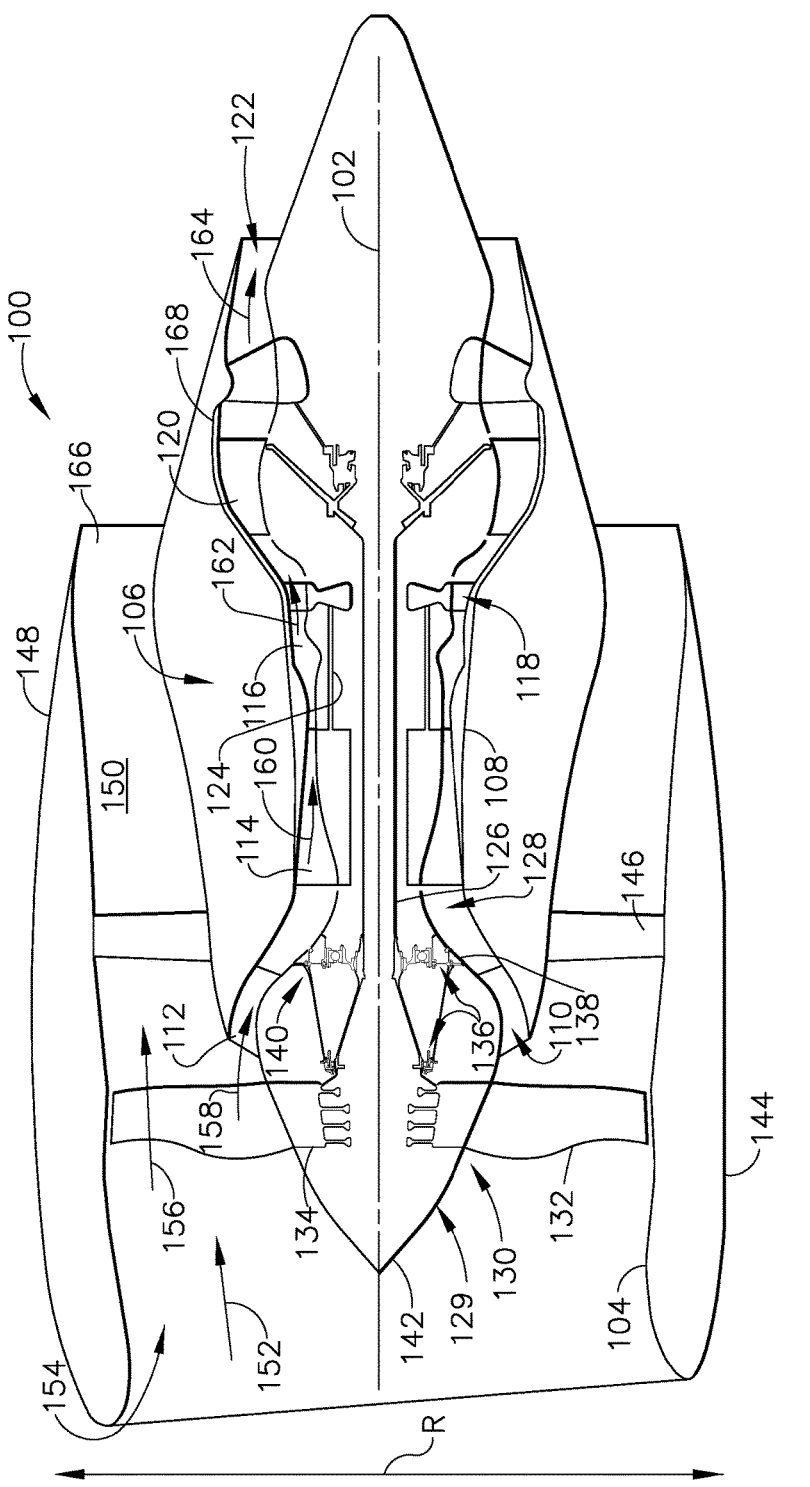
FIG. 1 is a schematic cross-sectional view of an exemplary turbofan engine in accordance with an example embodiment of the present disclosure.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "axial" and "axially" refer to directions and orientations that extend substantially parallel to a centerline of an engine. Moreover, the terms "radial" and "radially" refer to directions and orientations that extend substantially perpendicular to the centerline of the engine. In addition, as used herein, the terms "circumferential" and "circumferentially" refer to directions and orientations that extend arcuately about the centerline of the engine.

Embodiments of a load reduction assembly for a turbofan engine as described herein provide an assembly that facilitates reducing a fan blade out load and a subsequent windmilling load transferred from a bearing assembly to an engine frame. Specifically, in the exemplary embodiments, the load reduction assembly includes a shape memory alloy member that is responsive to a change in a stress condition so as to change stiffness thereof, thus regulating an imbalance condition of a rotor shaft coupled to the bearing assembly. As such, during a high stress condition of the fan blade out, the load reduction assembly reduces stiffness such that the rotor shaft mode is reduced, and during a low stress condition of windmilling, the load reduction assembly regains its stiffness such that vibration loads are reduced. By forming the load reduction assembly from the shape memory alloy overall engine weight is reduced and fuel efficiency is increased.

FIG. 1 is a schematic cross-sectional view of gas turbine engine 100 in accordance with an exemplary embodiment of the present disclosure. In the exemplary embodiment, gas turbine engine 100 is embodied in a high-bypass turbofan jet engine, referred to herein as "turbofan engine." As shown in FIG. 1, turbofan engine 100 defines an axial direction A (extending parallel to a longitudinal centerline 102 provided for reference) and a radial direction R (extending perpendicular to longitudinal centerline 102). In general, turbofan engine 100 includes a fan case assembly 104 and a core engine 106 disposed downstream from fan case assembly 104.

Core engine 106 includes an engine case 108 that defines an annular inlet 110. Engine case 108 at least partially surrounds, in serial flow relationship, a compressor section including a booster or low pressure (LP) compressor 112 and a high pressure (HP) compressor 114; an annular combustion section 116; a turbine section including a high pressure (HP) turbine 118 and a low pressure (LP) turbine 120; and a jet exhaust nozzle section 122. A high pressure (HP) shaft or spool 124 drivingly connects HP turbine 118 to HP compressor 114. A low pressure (LP) shaft or spool 126 drivingly connects LP turbine 120 to LP compressor 112. The compressor section, combustion section 116, turbine section, and nozzle section 122 together define an air flow path 128.

In the exemplary embodiment, a fan assembly 129 includes a fan 130 having a plurality of fan blades 132 coupled to a disk 134 in a spaced apart manner. As depicted, fan blades 132 extend outwardly from disk 134 generally along radial direction R. Fan blades 132 and disk 134 are together rotatable about longitudinal centerline 102 by LP shaft 126. LP shaft 126 is supported at by a plurality of bearing assemblies, for example a number two bearing assembly 136 at a forward end of LP shaft 126. Bearing assembly 136 is coupled to an engine frame 138 through a load reduction assembly 140 that will be discussed in further detail below.

Referring still to the exemplary embodiment of FIG. 1, disk 134 is covered by a rotatable front hub 142 aerodynamically contoured to promote an airflow through plurality of fan blades 132. Additionally, fan case assembly 104 includes an annular fan casing or outer nacelle 144 that circumferentially surrounds fan 130 and/or at least a portion of core engine 106. Nacelle 144 is supported relative to core engine 106 by a plurality of circumferentially-spaced outlet guide vanes 146. Moreover, a downstream section 148 of nacelle 144 may extend over an outer portion of core engine 106 so as to define a bypass airflow passage 150 therebetween.

During operation of turbofan engine 100, a volume of air 152 enters turbofan engine 100 through an associated inlet 154 of nacelle 144 and/or fan case assembly 104. As volume of air 152 passes across fan blades 132, a first portion 156 of air 152, known as fan stream air flow, is directed or routed into bypass airflow passage 150 and a second portion 158 of volume of air 152 is directed or routed into air flow path 128, or more specifically into booster compressor 112. A ratio between first portion 156 and second portion 158 is commonly referred to as a bypass ratio. The pressure of second portion 158 is then increased, forming compressed air 160, as it is routed through booster compressor 112 and HP compressor 114 and into combustion section 116, where it is mixed with fuel and burned to provide combustion gases 162.

Combustion gases 162 are routed through HP turbine 118 where a portion of thermal and/or kinetic energy from combustion gases 162 is extracted via sequential stages of HP turbine stator vanes (not shown) that are coupled to engine case 108 and HP turbine rotor blades (not shown) that are coupled to HP shaft or spool 124, thus causing HP shaft or spool 124 to rotate, which drives a rotation of HP compressor 114. Combustion gases 162 are then routed through LP turbine 120 where a second portion of thermal and kinetic energy is extracted from combustion gases 162 via sequential stages of LP turbine stator vanes (not shown) that are coupled to engine case 108 and LP turbine rotor blades (not shown) that are coupled to LP shaft or spool 126, which drives a rotation of LP shaft or spool 126 and booster compressor 112, and/or rotation of fan 130.

Combustion gases 162 are subsequently routed 164 through jet exhaust nozzle section 122 of core engine 106 to provide propulsive thrust. Simultaneously, the pressure of first portion 156 is substantially increased as first portion 156 is routed through bypass airflow passage 150 before it is exhausted from a fan nozzle exhaust section 166 of turbofan engine 100, also providing propulsive thrust. HP turbine 118, LP turbine 120, and jet exhaust nozzle section 122 at least partially define a hot gas path 168 for routing combustion gases 162 through core engine 106.

Turbofan engine 100 is depicted by way of example only, in other exemplary embodiments, turbofan engine 100 may have any other suitable configuration including for example, a turboprop engine, a military purpose engine, and a marine or land-based aero-derivative engine.

Figure 2:
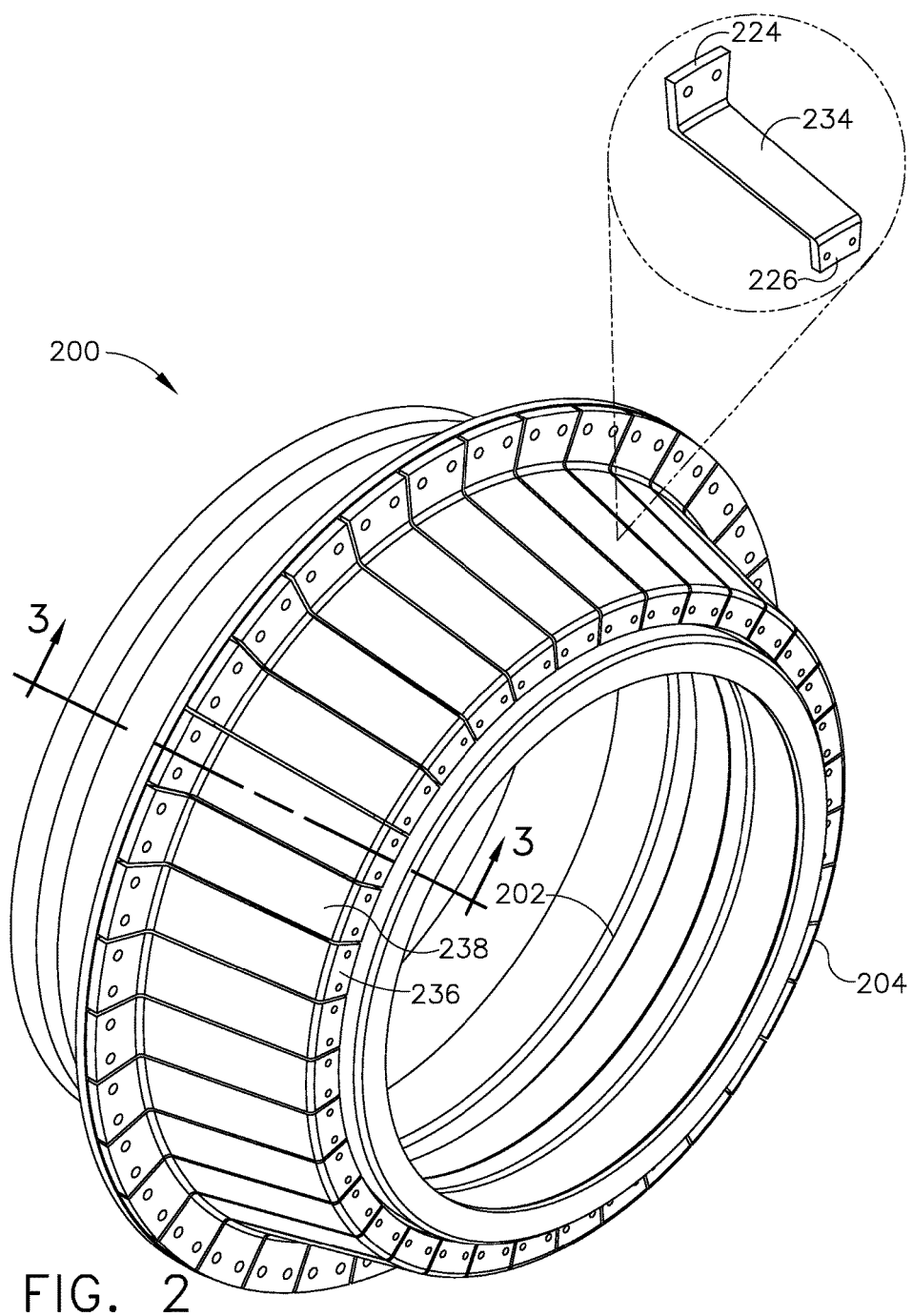
FIG. 2 is a perspective view of an exemplary load reduction assembly that may be used with the turbofan engine shown in FIG. 1.
Figure 3:
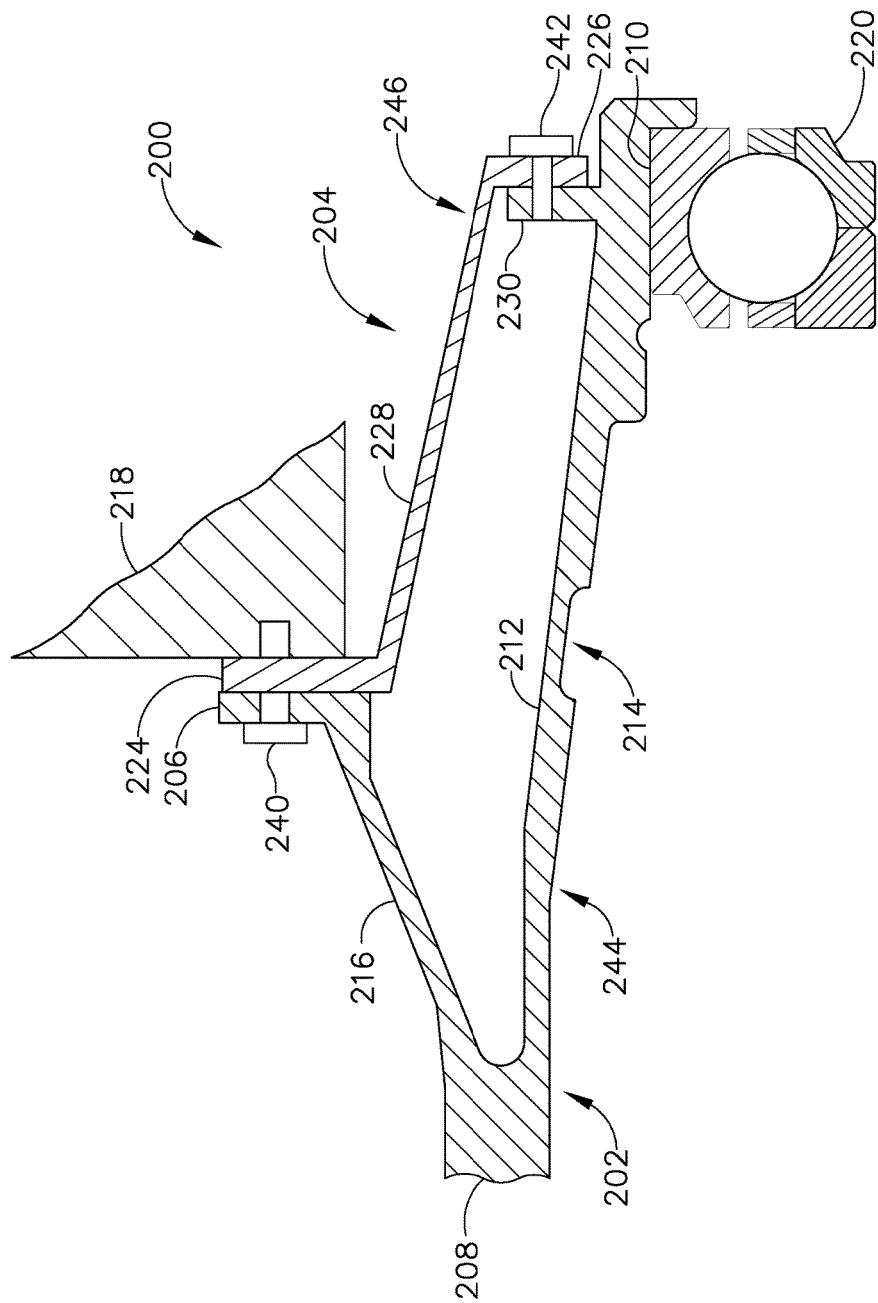
FIG. 3 is a cross-sectional view of the load reduction assembly shown in FIG. 2 taken along line 3-3.

FIG. 2 is a perspective view of an exemplary load reduction assembly 200 that may be used with turbofan engine 100 (shown in FIG. 1.). FIG. 3 is a cross-sectional view of load reduction assembly 200 taken along line 3-3. Referring to FIGS. 2 and 3, in the exemplary embodiment, load reduction assembly 200 includes an annular bearing cone 202 and an annular recoupler member 204. Bearing cone 202 includes a radially outer flange 206, a radially middle section 208, and a radially inner race 210. Extending axially between radially middle section 208 and radially inner race 210 is a radially inner member 212. Radially inner member 212 includes at least one fuse 214 defined thereon. In alternative embodiments, radially inner member 212 does not include fuses defined thereon. Extending axially between radially middle section 208 and radially outer flange 206 is a radially outer member 216. As such, bearing cone 202 is generally V-shaped. In alternative embodiments, bearing cone 202 has any other structure and/or shape that enables bearing cone 202 to function as described herein. In the exemplary embodiment, bearing cone 202 is coupled to a static frame assembly 218 at radially outer flange 206 and is coupled to a bearing assembly 220 at radially inner race 210. In the exemplary embodiment, bearing assembly 220 includes the number 2 bearing of turbofan engine 100.

Recoupler member 204 includes a radially outer flange 224 and a radially inner flange 226 with a support member 228 extending therebetween. Radially outer flange 224 is coupled to static frame assembly 218 and radially inner flange 226 is coupled to a radially inner flange 230 extending from second radially inner race 210. Recoupler member 204 is formed from a shape memory alloy (SMA). SMA is an alloy, such as, but not limited to, a Nickel-Titanium (NiTi) alloy, a Nickel-Titanium-Hafnium alloy, a Nickel-Titanium-Palladium alloy, or a Copper-Aluminum-Nickel alloy, that changes crystalline structure, and thereby mechanical properties, when subjected to mechanical stress changes. For example, SMA at a lower stress condition is has greater stiffness, but when loaded with mechanical stress, SMA at a higher stress condition has lower stiffness and is more ductile. Specifically, the lower stress phase is known as an austenite phase that has a first crystalline structure that facilitates an increased stiffness. When stress is applied above a predetermined stress level, SMA changes phase to a higher stress phase that is known as a martensite phase and has a second crystalline structure. The martensite phase facilitates SMA to be subjected to large deformations and a decreased stiffness. The martensite phase has a modulus of elasticity that is lower than the austenitic phase. This phase change is a reversible process, and SMA may change from the martensite phase to the austenitic phase and back again while recovering strain therein. SMA is discussed further below in reference to FIG. 8.

In the exemplary embodiment, recoupler member 204 is formed from a plurality of individual SMA segments 234. By using multiple SMA segments 234 the stiffness response of recoupler member 204 may be fine-tuned. For example, a first SMA segment 236 is responsive to a change in a first predetermined stress condition and a second SMA segment 238 is responsive to a change in a second predetermined stress condition such that the first stress condition is substantially not equal to the second stress condition. In alternative embodiments, recoupler member 204 is unitary and formed from a rolled sheet of SMA. In other embodiments, recoupler member 204 is formed from SMA and at least one of radially outer flange 224 and/or radially inner flange 226 may be formed from another alloy, for example steel, and coupled to recoupler member 204 through a weld.

Load reduction assembly 200 further includes a plurality of radially outer bolts 240 that facilitate coupling both bearing cone radially outer flange 206 and recoupler member radially outer flange 224 to frame assembly 218. A plurality of radially inner bolts 242 facilitate coupling bearing cone radially inner flange 230 and recoupler member radially inner flange 226 together such that recoupler member 204 is coupled to bearing assembly 220. In alternative embodiments, bearing cone 202 is individually coupled to frame assembly 218 and/or bearing assembly 220 through fusible bolts such that fuse 214 does not need to be defined on radially inner member 212.

In the exemplary embodiment, bearing assembly 220 is located in a number two bearing position. As such, bearing assembly 220 is a fan thrust bearing. In alternative embodiments, load reduction assembly 200 may be used for any rotor bearing assembly within turbofan engine 100.

Figure 6:
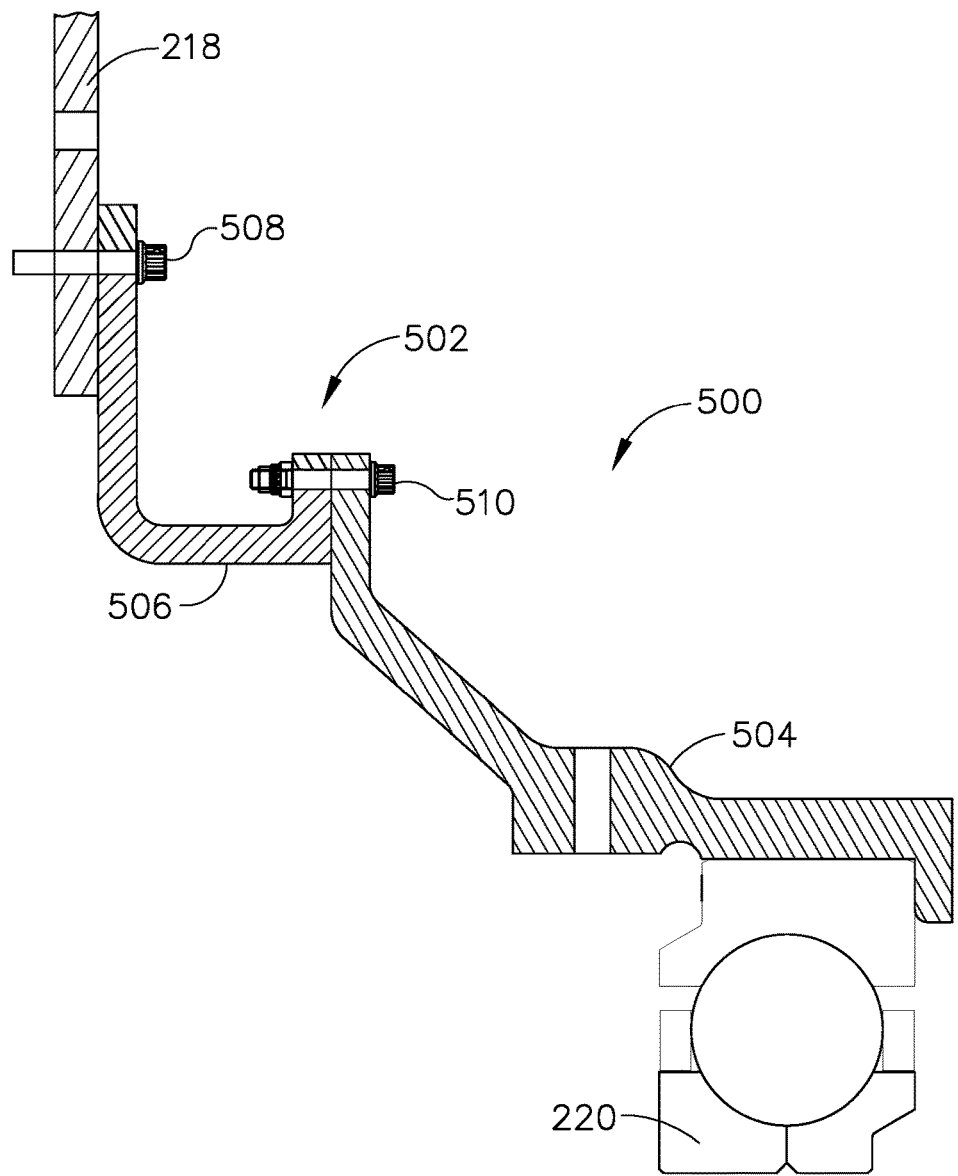
FIG. 6 is a cross-sectional view of yet another exemplary load reduction assembly that may be used with the turbofan engine shown in FIG. 1.

During general operation of turbofan engine 100, load reduction assembly 200 forms a load path 244 from bearing assembly 220 to frame assembly 218. For example, load reduction assembly 200 includes a parallel load path that includes bearing cone 202 as a first load path and recoupler member 204 as a second load path 246. As such, loads from LP shaft 126 (shown in FIG. 1) are induced in bearing assembly 220 and transferred through load reduction assembly 200 to frame assembly 218. The loads induced through load reduction assembly 200 during general engine 100 operations are such that SMA is in its austenite phase and has a higher modulus of elasticity as illustrated in FIG. 6 and discussed further below. Additionally, the loads induced through bearing cone 202 are such that fuse 214 is not overcome.

When turbofan engine 100 experiences a fan blade-out (FBO) event, wherein a portion of fan blades 132 (shown in FIG. 1) are removed from turbofan engine 100, an imbalanced load is generated by LP shaft 126 (shown in FIG. 1). The imbalanced load induces a radial load on bearing assembly 220 that depends on a natural frequency mode of LP shaft 126. As the FBO load induced through load reduction assembly 200 increases, exceeding a predetermined load that facilitates overcoming and breaking fuse 214 such that first load path 244 through bearing cone 202 is removed. As such, recoupler member 204 and second load path 246 is a sole load path between bearing assembly 220 and frame assembly 218. Higher loads are then transferred through recoupler member 204 such that a predetermined stress condition is induced through SMA, and SMA changes its phase to the martensite phase. As such, SMA has a lower modulus of elasticity and facilitates dropping the frequency mode of LP shaft 126 thereby regulating the imbalance load from the FBO event and reducing the load transferring to frame assembly 218. In alternative embodiments, bearing cone 202 does not have a fuse, however higher loads are still transferred through recoupler member 204 such that a predetermined stress condition is induced and the stiffness of load reduction assembly 200 is reduced to facilitate dropping the frequency mode of LP shaft 126.

During a post FBO event, also known as windmilling, the remaining fan blades 132 and LP shaft 126 continue to rotate to reduce aerodynamic drag of turbofan engine 100. However, during windmilling, the imbalanced load subsides and the rotation of LP shaft 126 is slower thereby reducing loads generated by LP shaft 126 and reducing the induced loads on bearing assembly 220. As such, the lower loads that are below the predetermined load and stress conditions for the martensite phase are transferred through recoupler member 204. Thus, SMA changes its phase back to its austenite phase and regains its strain and increases its modulus of elasticity. As such, vibration from windmilling is reduced in turbofan engine 100.

Figure 4:
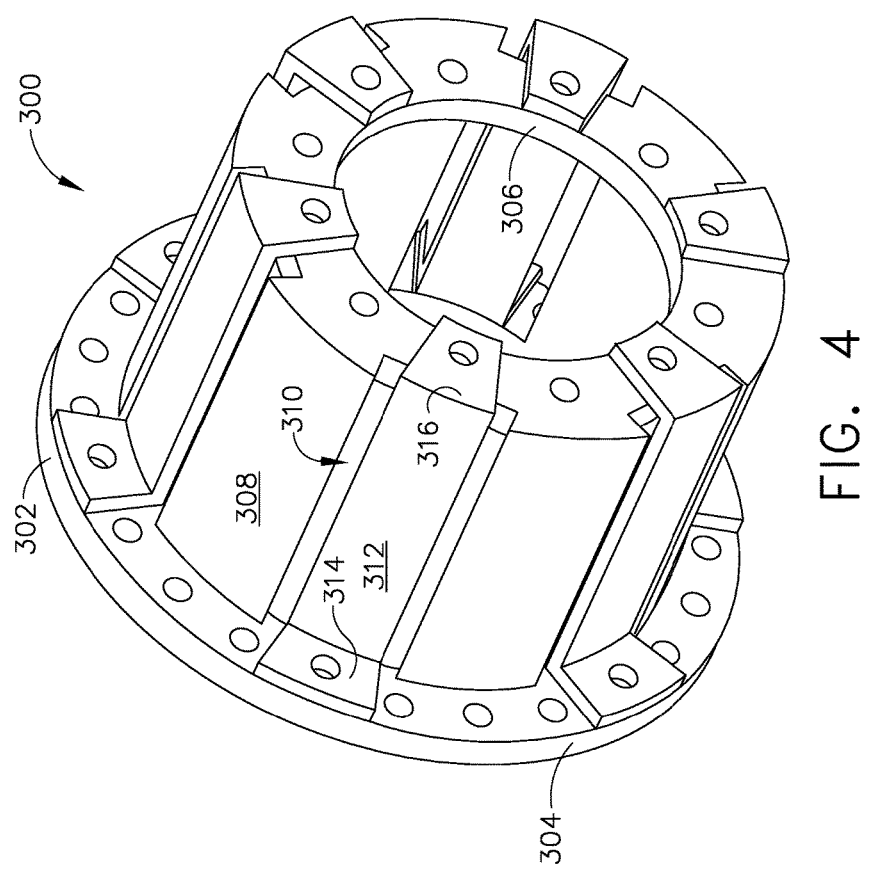
FIG. 4 is a perspective view of another exemplary load reduction assembly that may be used with the turbofan engine shown in FIG. 1.

FIG. 4 is a perspective view of another exemplary load reduction assembly 300 that may be used with turbofan engine 100 (shown in FIG. 1). In the exemplary embodiment, load reduction assembly 300 includes an annular cage 302. Annular cage 302 includes a radially outer flange 304 that facilitates coupling load reduction assembly 300 to frame assembly 218 (shown in FIG. 3) and a radially inner flange 306 that facilitates coupling load reduction assembly 300 to bearing cone radially inner flange 230 and bearing assembly 220 (both shown in FIG. 3). Extending between radially outer flange 304 and radially inner flange 230 are a plurality of circumferentially spaced support members 308. As such, a plurality of openings 310 are defined within annular cage 302 that extend from radially outer flange 304 to radially inner flange 306. In the exemplary embodiment, annular cage 302 is formed from shape memory alloy (SMA) as discussed above.

Load reduction assembly 300 further includes a plurality of struts 312 that are circumferentially spaced around annular cage 302 and positioned within each opening 310 respectively. Each strut 312 includes a first flange 314 and an opposite second flange 316. First flange 314 corresponds to radially outer flange 304 and second flange 316 corresponds to radially inner flange 306. In the exemplary embodiment, radially outer flange 304 and first flange 314 are coupled to frame assembly 218 through a plurality of radially outer bolts (not shown). Radially inner flange 306 and second flange 316 are coupled to bearing cage radially inner flange 230 through a plurality of radially inner bolts (not shown). In the exemplary embodiment, each strut 312 is form from an alloy other than SMA, for example steel.

Similar to the embodiments described above, load reduction assembly 300 forms a load path from bearing assembly 220 to frame assembly 218. Additionally, within load reduction assembly 300, the load is transferred through both annular cage 302 and each strut 312 in parallel. During the FBO event, bolts that couple each strut 312, are fuseable and their strength overcome due to the load transferred therethrough, thereby forming annular cage 302 as the sole load path. Annular cage 302 thus facilitates reducing the imbalanced load from the FBO event and windmilling, and changes phase between the austenite phase and the martensite phase. Additionally, by forming openings 310 within annular cage 302, the weight of load reduction assembly 300 is reduced, and material costs are reduced.

Figure 5:
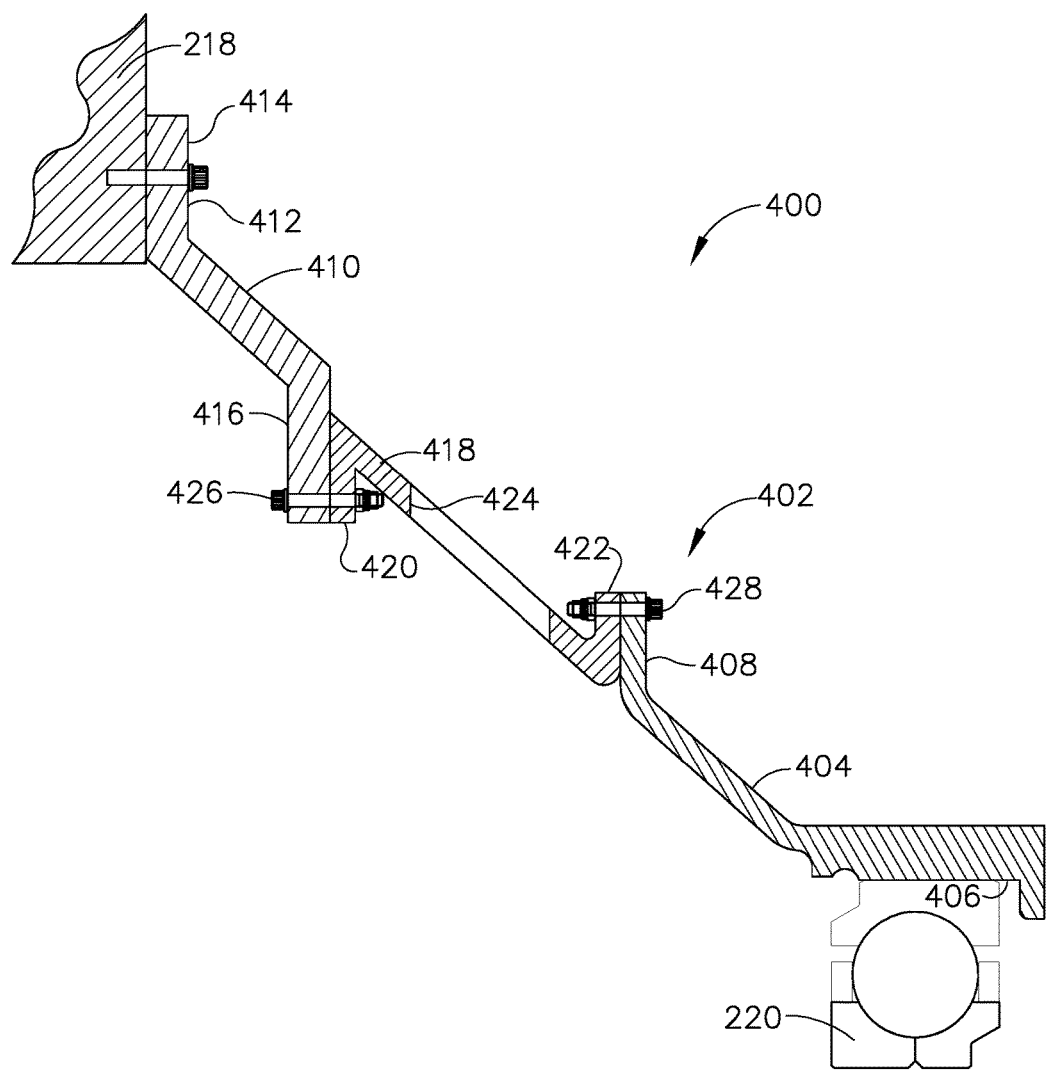
FIG. 5 is a cross-sectional view of a further exemplary load reduction assembly that may be used with the turbofan engine shown in FIG. 1.

FIG. 5 is a cross-sectional view of a further exemplary load reduction assembly 400 that may be used with turbofan engine 100 (shown in FIG. 1). In the exemplary embodiment, load reduction assembly 400 includes an annular bearing support 402 that extends between bearing assembly 220 and static frame assembly 218. Bearing support 402 includes a bearing member 404 that couples to bearing assembly 220 at a radially inner race 406. Opposing radially inner race 406, bearing member 404 includes a flange 408. Bearing support 402 further includes a frame member 410 that is coupled to frame assembly 218 at a first flange 412 through a plurality of bolts 414. Opposing first flange 412, frame member 410 includes a second flange 416. In the exemplary embodiment, bearing member 404 and frame member 410 are formed from a first alloy such as steel.

Bearing support 402 further includes an insert member 418 coupled between bearing member 404 and frame member 410. Insert member 418 includes a first flange 420 that corresponds to frame member flange 416 and an opposite second flange 422 that corresponds to bearing member flange 408. In the exemplary embodiment, insert member 418 is formed from shape memory alloy (SMA) as discussed above. In some embodiments, insert member 418 includes a plurality of circumferentially spaced openings 424 defined therein. Openings 424 facilitate reducing the weight of load reduction assembly 400 and as well as reducing material costs.

In the exemplary embodiment, insert member 418 is coupled to frame member 410 through a plurality of bolts 426 that extend through both flanges 416 and 420 respectively. Additionally, insert member 418 is coupled to bearing member 404 through a plurality of bolts 428 that extend through both flanges 422 and 408 respectively. In some embodiments, insert member 418 is coupled to both frame member 410 and bearing member 404 through a double bolt connection having a radially outer bolt row and a radially inner bolt row. In other embodiments, insert member 418 is coupled to both frame member 410 and bearing member 404 through a welded connection. Additionally, in alternative embodiments insert member 418 and bearing member 404 may be formed as a single member with SMA such that bearing support 402 includes only two members and one connection joint, frame member 410 and bearing member 404 including SMA. Similarly, insert member 418 and frame member 410 may be formed as a single member with SMA such that bearing support 402 include only two members and one connection joint, frame member 410 including SMA and bearing member 404. Furthermore, in the exemplary embodiment, insert member 418 is illustrated as generally Z-shaped, however, in alternative embodiments, insert member 418 may have any other shape that enables bearing support 402 to function as described herein.

Similar to the embodiments described above, bearing support 402 forms the load path from bearing assembly 220 to frame assembly 218. As such, during turbofan engine operation, load from LP shaft 126 (shown in FIG. 1) is transferred through bearing member 404, insert member 418 in the austenite phase, and frame member 410. During the FBO event, higher loads from LP shaft 126 are transferred through insert member 418 such that upon exceeding a predetermined load, a predetermined stress condition is induced through SMA, such that SMA changes its phase to the martensite phase. As such, SMA has a lower modulus of elasticity and facilitates dropping the frequency mode of LP shaft 126, thereby regulating the imbalance load from the FBO event and reducing the load transferring to frame assembly 218. During windmilling, the rotation of LP shaft 126 is slower, thereby reducing loads generated by LP shaft 126 and reducing the induced loads on bearing assembly 220. As such, the lower loads that are below the predetermined load and stress conditions for the martensite phase are transferred through insert member 418. Thus, SMA changes its phase back to its austenite phase and regains its strain and increases its modulus of elasticity. As such, vibration from windmilling is reduced in turbofan engine 100. By forming only a portion of bearing support 402 with SMA, the weight of load reduction assembly 400 is reduced, and material costs are reduced.

FIG. 6 is a cross-sectional view of yet another exemplary load reduction assembly 500 that may be used with turbofan engine 100 (shown in FIG. 1). In the exemplary embodiment, load reduction assembly 500 includes an annular bearing support 502 that extends between bearing assembly 220 and static frame assembly 218. Bearing support 502 includes a bearing member 504 that couples to bearing assembly 220. Bearing support 502 also includes a frame member 506 that is coupled to frame assembly 218 through a plurality of bolts 508. In the exemplary embodiment, bearing member 504 is formed from a first alloy such as steel and frame member 506 from a second alloy such as a shape memory alloy (SMA) as discussed above. Bearing member 504 and frame member 506 are coupled through a plurality of bolts 510. In alternative embodiments, frame member 506 may be welded to both static frame assembly 218 and bearing member 504.

Similar to the embodiments described above, bearing support 502 forms the load path from bearing assembly 220 to frame assembly 218. As such, during turbofan engine operation, load from LP shaft 126 (shown in FIG. 1) is transferred through bearing member 504 and frame member 506 in the austenite phase. During the FBO event, higher loads from LP shaft 126 are transferred through frame member 506 such that upon exceeding a predetermined load, a predetermined stress condition is induced through SMA, such that SMA changes its phase to the martensite phase. As such, SMA has a lower modulus of elasticity and facilitates dropping the frequency mode of LP shaft 126, thereby regulating the imbalance load from the FBO event and reducing the load transferring to frame assembly 218. During windmilling, the rotation of LP shaft 126 is slower, thereby reducing loads generated by LP shaft 126 and reducing the induced loads on bearing assembly 220. As such, the lower loads that are below the predetermined load and stress conditions for the martensite phase are transferred through frame member 506. Thus, SMA changes its phase back to its austenite phase and regains its strain and increases its modulus of elasticity. As such, vibration from windmilling is reduced in turbofan engine 100. By forming only a portion of bearing support 502 with SMA, the weight of load reduction assembly 500 is reduced, and material costs are reduced.

Figure 7:
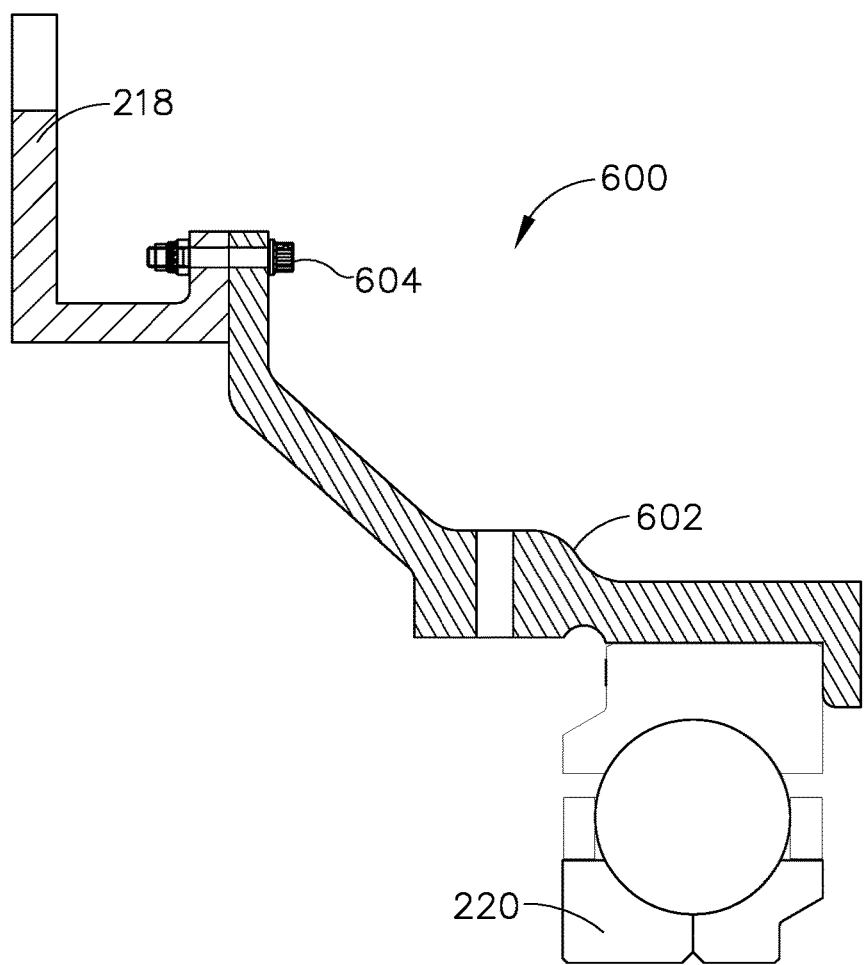
FIG. 7 is a cross-sectional view of yet a further exemplary load reduction assembly that may be used with the turbofan engine shown in FIG. 1.

FIG. 7 is a cross-sectional view of yet a further exemplary load reduction assembly 600 that may be used with the turbofan engine 100 (shown in FIG. 1). In the exemplary embodiment, load reduction assembly 600 includes an annular bearing support 602 that extends between bearing assembly 220 and static frame assembly 218. Bearing support 602 is coupled to static frame assembly 218 through a plurality of bolts 508. In alternative embodiments, bearing support 602 may be welded to static frame assembly 218. Bearing support 602 is formed from a shape memory alloy (SMA) as discussed above.

Similar to the embodiments described above, bearing support 602 forms the load path from bearing assembly 220 to frame assembly 218. As such, during turbofan engine operation, load from LP shaft 126 (shown in FIG. 1) is transferred through bearing support 602 in the austenite phase. During the FBO event, higher loads from LP shaft 126 are transferred through bearing support 602 such that upon exceeding a predetermined load, a predetermined stress condition is induced through SMA, such that SMA changes its phase to the martensite phase. As such, SMA has a lower modulus of elasticity and facilitates dropping the frequency mode of LP shaft 126, thereby regulating the imbalance load from the FBO event and reducing the load transferring to frame assembly 218. During windmilling, the rotation of LP shaft 126 is slower, thereby reducing loads generated by LP shaft 126 and reducing the induced loads on bearing assembly 220. As such, the lower loads that are below the predetermined load and stress conditions for the martensite phase are transferred through bearing support 602. Thus, SMA changes its phase back to its austenite phase and regains its strain and increases its modulus of elasticity. As such, vibration from windmilling is reduced in turbofan engine 100.

Figure 8:
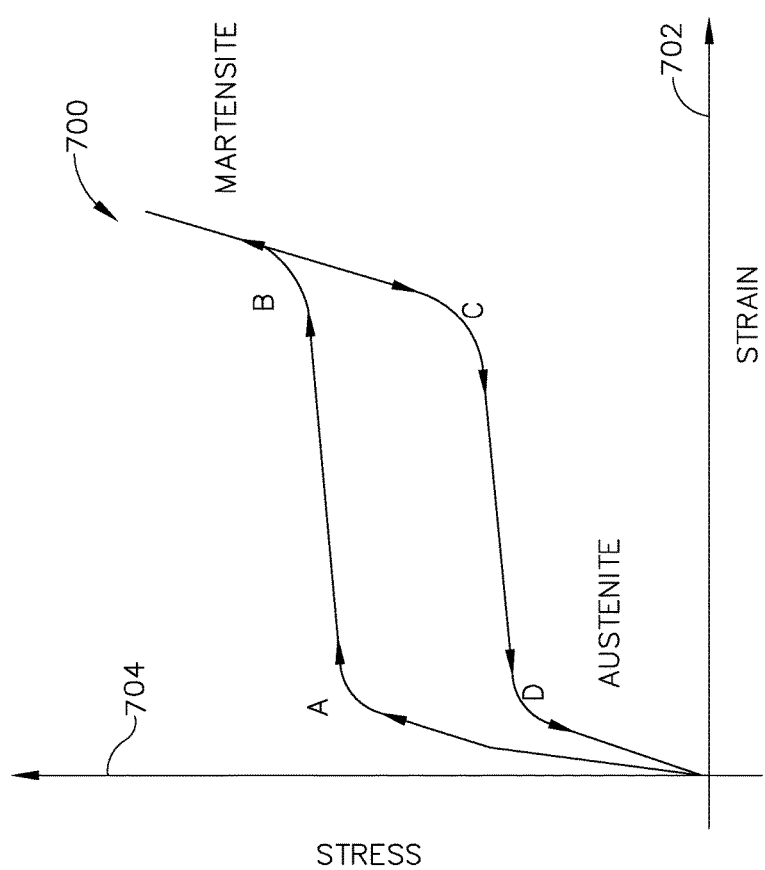
FIG. 8 is an illustration for an exemplary stress-strain curve for a shape memory alloy that may be used with the load reduction assemblies shown in FIGS. 2-5.

FIG. 8 is an illustration for an exemplary stress-strain curve 700 for a shape memory alloy that may be used with load reduction assemblies 200, 300, 400, 500, and 600 (shown in FIGS. 2-7). In the exemplary stress-strain curve 700, x-axis 702 defines strain of SMA and y-axis 704 defines stress of SMA. At a first load threshold (defined by points A and B), SMA may undergo a large strain (e.g., for NiTi, typically in the range of 2% to 4%), thereby reducing stiffness and facilitating deformation of SMA. In this regard, point A represents the start of the solid-solid phase transformation from austenite to martensite, and point B represents the end of this solid-solid phase transformation. Additionally, SMA may recover all the strain once the load drops below a second load threshold (defined by points C and D), thereby increasing stiffness and facilitating a return back to an initial shape. In this regard, point C represents the start of the reverse phase transformation from martensite to austenite, and point D represents the end of this reverse phase transformation.

The above-described embodiments of a load reduction assembly for a turbofan engine provides a cost effective method for reducing a fan blade out load and a subsequent windmilling load transferred from a bearing assembly to an engine frame. During the fan blade out, a rotor shaft induces an imbalanced load on the bearing assembly. As such, the load reduction assembly reduces stiffness to reduce the rotor shaft mode and reduced the imbalanced load transferred to the engine frame. However, the imbalanced load subsides during windmilling. As such, the load reduction assembly increases stiffness to reduce vibration transferred to the engine frame. In the exemplary embodiments, the load reduction assembly includes a shape memory alloy member that is responsive to a change in a stress condition so as to change stiffness thereof, thus regulating an imbalance condition of a rotor shaft coupled to the bearing assembly. Specifically, during a high stress condition of the fan blade out, the load reduction assembly reduces stiffness such that the rotor shaft mode is reduced, and during a low stress condition of windmilling, the load reduction assembly regains its stiffness such that vibration loads are reduced. By forming the load reduction assemblies from the shape memory alloy both fan blade out loads and windmilling loads are managed. The load reduction assembly thus reduces overall engine weight and increases fuel efficiency.

Exemplary embodiments of methods, systems, and apparatus for load reduction assemblies are not limited to the specific embodiments described herein, but rather, components of the systems and/or steps of the methods may be utilized independently and separately from other components and/or steps described herein. For example, the methods may also be used in combination with other systems requiring load reductions and the associated methods, and are not limited to practice with only the systems and methods as described herein. Rather, the exemplary embodiment can be implemented and utilized in connection with many other applications, equipment, and systems that may benefit from load reduction assemblies.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A load reduction assembly comprising:
   an annular bearing cone configured to extend between a bearing assembly and a frame assembly and form a first load path therebetween;
   an annular recoupler member configured to extend between the bearing assembly and the frame assembly and form a second load path therebetween, the second load path parallel to the first load path, wherein said recoupler member comprises a shape memory alloy configured to change stiffness in response to a change in a stress condition, thereby regulating an imbalance condition of a rotor shaft coupled to the bearing assembly; and
   wherein said bearing cone comprises a fuse configured to be overcome during the imbalance condition of the rotor shaft such that said recoupler member and the second load path is a sole load path between the bearing assembly and the frame assembly.

2. The load reduction assembly of claim 1, wherein said shape memory alloy is configured to have a first stiffness in response to a first predetermined stress sensed thereon.

3. The load reduction assembly of claim 1, wherein said shape memory alloy is configured to have a second stiffness in response to a second predetermined stress sensed thereon.

4. The load reduction assembly of claim 1, wherein said shape memory alloy is configured to substantially regain an original stiffness after the imbalance condition subsides.

5. The load reduction assembly of claim 1, wherein said recoupler member is unitary.

6. The load reduction assembly of claim 1, wherein said recoupler member further comprises at least one flange welded thereon.

7. A load reduction assembly comprising:
   an annular bearing cone configured to extend between a bearing assembly and a frame assembly and form a first load path therebetween; and
   an annular recoupler member configured to extend between the bearing assembly and the frame assembly and form a second load path therebetween, the second load path parallel to the first load path, wherein said recoupler member comprises a plurality of shape memory alloy segments configured to change stiffness in response to a change in a stress condition, thereby regulating an imbalance condition of a rotor shaft coupled to the bearing assembly; and
   wherein a first shape memory alloy segment of said plurality of shape memory alloy segments is responsive to a change in a first stress condition and a second shape memory alloy segment of said plurality of shape memory alloy segments is responsive to a change in a second stress condition, the first stress condition is substantially not equal to the second stress condition.

8. The load reduction assembly of claim 7, wherein at least one of said plurality of shape memory alloy segments is configured to have a first stiffness in response to a first predetermined stress sensed thereon.

9. The load reduction assembly of claim 7, wherein at least one of said plurality of shape memory alloy segments is configured to have a second stiffness in response to a second predetermined stress sensed thereon.

10. The load reduction assembly of claim 7, wherein said plurality shape memory alloy segments are configured to substantially regain an original stiffness after the imbalance condition subsides.

11. The load reduction assembly of claim 7, wherein said recoupler member further comprises at least one flange welded thereon.

* * * * *